Patented Apr. 30, 1946

2,399,195

UNITED STATES PATENT OFFICE 2,399,195

CONFECTIONARY PRODUCT

Francis A. Bodenheim, Kew Gardens, N. Y.

No Drawing. Application January 20, 1945,
Serial No. 573,807

8 Claims. (Cl. 99—23)

This invention relates to products suitable for food and beverage purposes and is a continuation-in-part of my copending application Ser. No. 530,943, filed April 13, 1944, entitled "Confectionary product" which in turn is a continuation-in-part of prior application Ser. No. 413,485, filed October 3, 1941, and entitled "Confectionary product."

In accordance with the present invention, there is produced a product in a dry powder form which upon mixing with aqueous materials, such as water, milk, and the like, yields a liquid confectionary or beverage product. Among the advantages of this new product as prepared by the new process which produces said product, there may be mentioned the facts that the product in dry form when mixed with said liquids, e. g., water, milk, and the like, is rapidly dispersed or dissolved to produce a homogeneous liquid even when the dispersing medium, e. g., water, milk, and the like, is cold. It will readily be appreciated by those experienced or skilled in the art and even by those unskilled that the element of time is very important.

In attaining these results in accordance with the present invention, there is provided a mixture containing a sugar (sucrose, dextrose, etc.), water, and a material illustrated by those selected from the group consisting of cocoa, chocolate, milk solids, malted milk, coffee extract solids, and flavoring extract solids. In this mixture a maximum of about 15% by weight is placed on the water and a minimum of about 40% by weight is placed on the sugar. The remainder is made up of one or more of the materials specified, e. g., cocoa, milk solids, etc. Then the mixture is heated to a temperature elevated above room temperature and illustrated by temperatures of about 80 to 95° C. to produce a solution which is at least saturated at said elevated temperature in respect of the sugar content. It may even be supersaturated at said elevated temperature and in obtaining such supersaturation various protective hydrophilic colloids may be employed, e. g., agar, starch, and various gums, including dextrine and the like. In addition to protective colloids any of the non-sugars will also assist in obtaining supersaturation. The use of said protective colloids or non-sugars is permissive and not mandatory. Then the mixture is cooled to a maximum temperature at which the solution becomes higher super-saturated in respect of said sugar, for example, to a temperature not higher than about normal room temperature with the object of obtaining a solid mass. This solid mass is then progressively disintegrated and dried until the moisture content of the product is not more than about 2 to 3%, this drying being preferably effected by use of a current of gas, for example, air, at about room temperature or somewhat above. The product is then reheated with constant agitation until the sugar content of the mass becomes homogeneously crystalline.

This principle can be successfully applied to a variety of food and beverage products. It will be illustrated first by a reproduction of the description in my copending application Ser. No. 530,943 with references to cocoa, chocolate and the like and this description will then be followed by other specific examples illustrating the application of the principle to other beverage and food products. The description which immediately follows, therefore, is a reproduction of the specification of said copending application Ser. No. 530,943, to which there will be appended a description of the application of said principle to said other beverage and food products.

Chocolated fudges, icings, sauces, syrups, beverages, etc., are extensively used as articles of consumption and are either prepared in household kitchens, restaurants, soda fountains, etc., or in manufacturing plants.

Each of these products require a different method of processing and a different combination of the ingredients which principally consist of sugar and cocoa. One of the objects of this invention is to produce a base material which, upon being mixed with water, will instantly produce either one of these articles of consumption, having the desired qualities and its production depending only on the amounts of water used for the mixing. The desired qualities for the resulting articles of consumption are as follows:

*A fudge.*—Should be of smooth and uniform texture, and remain in a semi-plastic condition for some time after it is made. Neither should the color change during a reasonable length of time.

*An icing.*—Should spread easily and uniformly over the material to which it is applied. It should set quickly and after setting should show a minimum of grittiness, adhere to the material over which it is spread and, upon standing for a reasonable time, should not become crusty and break off from its base, change its color, or lose its glossy appearance.

*A sauce.*—Should be of a smooth texture and have sufficient viscosity to adhere evenly to the material over which it is spread and preserve its glossy surface for some time.

*A syrup.*—Should be of smooth texture and the ingredients should remain in solution and suspension for a long time. A syrup should have a noticeable "body" and be easily mixable with other fluids.

*A beverage.*—Should not readily separate into its constituents and if, after standing for some time, a part of the ingredients separate and a sediment is formed, such a sediment will go again readily in suspension when the beverage is only slightly stirred. Besides these particular characteristics of each of these articles of consumption, they all should have in common the desired taste, flavor and appearance.

As to the base material from which these articles of consumption are produced by simply mixing this material with water in different proportions, this material should have a distinct cocoa color, should be dry and free flowing and remain stable, non-hygroscopic and non-caking under all kinds of climatic and atmospheric conditions and should be easily wettable and penetrable by water.

In order to produce this base material having these desired qualities and in order to produce from this base material by mixing the same with different proportions of water, the final edible products such as fudges, icings, sauces, syrups, etc., having the desired qualities, it is of first importance, that the ingredients, especially the sugar and cocoa, of this base material are of minute particle size and thoroughly dispersed among each other and that the cocoa particles are "hydrolized" by having been preboiled.

The process of this invention produces such a base material.

In accordance with this invention, a hot highly super-saturated solution of sugar is produced, containing sufficient cocoa to make a chocolated product.

The heat and water content of this solution "hydrolizes" the cocoa particles.

This solution is stabilized and thereby prevents the deposit of sugar crystals from this highly supersaturated sugar solution at this stage of the process.

The "stabilizing" agent comprises, in general, an edible hydrophilic gel-forming colloid, typified by agar-agar gelatine, alginates, etc.

The "hydrolized" cocoa acts also as a stabilizer in this respect, while the absorption of water by the cocoa, during this "hydrolization" increases the supersaturation of the sugar solution. At this point a certain small amount of finely powdered sugar is thoroughly dispersed in the solution and thereby reduces the mobility of the solution. This decreased mobility retards the growth of the minute crystals of sugar, which are precipitated from the highly supersaturated solution during the subsequent steps of the process.

The product is then homogenized to thoroughly disperse the ingredients. During this homogenizing step, the cocoa particles are further divided, and thereby on account of the increasing surface absorb more water from the solution, which absorption further increases the supersaturation of the sugar in the solution. The product is then cooled and subjected to gradual air drying in conjunction with gradual disintegration, until finally a very finely divided product is obtained, which is, substantially a mass of very finely divided sugar crystals of minute size and finely divided "hydrolized" cocoa particles of minute size, dispersed in a gel of the hydrophilic gel-forming material, formed by cooling and gradual water removal from and crystallization of the stabilized highly supersaturated sugar solution.

This gradual water removal in conjunction with gradual disintegration, prevents the formation of agglomerates of the minute particles of sugar and cocoa in the dried material, which are not easily penetrable by water.

By way of illustration but not limitation, the following examples of an embodiment of the process of the invention is given.

*Example 1*

1. Preparation of the agar solution: The equipment may include two steam jacketed kettles, each provided with an efficient stirring mechanism. The capacity of each kettle to be about 250 gallons. One kettle is filled with 200 gallons of water and brought to the boiling temperature. Then 20 pounds of flaked pure agar is added under constant stirring, keeping the temperature at the boiling point until all of the agar is totally dissolved. This procedure can be accomplished in about four (4) hours.

While this agar solution is used in the next process step, the other kettle is used for preparing another batch of this 1.2% agar solution which will be ready for use when the first kettle is empty.

2. Preparation of the dry cocoa-sugar mixture: The equipment may include a socalled "Day" mixer in which fine granulated refined sugar is thoroughly mixed with a good grade of cocoa (not Dutch processed) having a cocoa butter percentage not exceeding 10% in the proportion of 90 parts sugar and 25 parts of cocoa. When these ingredients are thoroughly and homogeneously mixed and dispersed among themselves, this finished mix is then discharged into a storage bin having a capacity of about 2500 pounds.

This step in the process breaks up the agglomerated cocoa particles and thereby facilitates the emulsifying and dispersion of the cocoa in the subsequent steps of the process. A granulated sugar is preferred over powdered sugar as such sugar is not only cheaper but the sharp edges of the sugar crystals cut the cocoa agglomerates into small divisions during the mixing. This dry mixing also facilitates the wetting of the cocoa during the next process step.

3. Preparation of the wet-cocoa sugar mixture: The equipment may include a steam jacketed kettle provided with an efficient stirring mechanism having a capacity of about 300 gallons. Forty-eight (48) gals. of the agar solution or 400 pounds are poured into this kettle and, under continuous stirring, the temperature is raised to about 95° C. When this temperature is reached, 2000 pounds of the dry cocoa-sugar mixture is discharged from the storage bin into this mixing kettle under continuous stirring. The temperature of the mixture will gradually decrease on account of the addition of the dry cocoa-sugar mix which is at room temperature. When this temperature becomes 85° C., it should be maintained at this level.

When the total 200 pounds of the dry cocoa sugar mixture is thoroughly dissolved and dispersed in the agar solution, the mixture is under continuous stirring, maintained at a temperature of 85° C. for about 10 minutes. At this point this mixture consists of 1565 pounds sugar, 435 pounds cocoa, 400 pounds water and 4.8 pounds of agar. The cocoa is emulsified and its starch contents hydrolized. The ratio between water and sugar is 20.5 to 79.5 which, at the temperature of 85° C., is the saturation point. As the cocoa has absorbed some of this water, the sugar is in an over-saturated solution, which state is stabilized by the presence of agar and cocoa. In other words, at this point of the process, the wet mixture consists of cocoa, emulsified in a super-saturated sugar solution, agar and the cocoa ingredient acting as a stabilizer. At this point of the process, 200 pounds of 4X sugar is added to the wet mix, under vigorous stirring, while the temperature of the mixture is raised to about 90° C.

Some of this added 4X sugar will remain as fine crystals in the wet mixture and when a sample of the mix shows, under the microscope, a homogeneous dispersion of these sugar crystals, then the wet mix is completed and ready for the next processing step. The effect of adding this 4X sugar to the wet mixture is to create a dispersion of fine sugar crystals throughout the mixture which now consists of a super-saturated sugar solution containing agar and in which emulsified cocoa particles and fine agar crystals are dispersed. The primary purpose of the addition of the 4X sugar is to reduce the mobility of the mother liquor from which fine sugar crystals are subsequently formed. This reduced mobility retards the growth of said crystals.

4. Flavoring: Just before the mixing of the previous processing step is completed, a dry combination of vanillin and vanilla and sugar is added to the mix, amounting to about 10 pounds per batch. This flavoring powder can be purchased ready made under the trade name of "Vano."

5. Homogenization and emulsification: The equipment consists of a "Marco Combinator." This machine acts as a homogenizer and colloid mill and has a capacity of about 200 gallons per hour equivalent to about 2000 pounds of dry substance in the wet mix. The batch of wet mix is discharged into the receiving hopper of the "Combinator" and the temperature of the wet mix entering the "Combinator" should not go below 85° C. During the swift passage of the wet mix through the "Combinator," the following reactions take place, the colloid mill part of this equipment subdivides the insoluble part of the cocoa-like fiber, shell, etc., and increases the surface of these materials very considerably with the result that a certain amount of the water of the wet mix is absorbed which, in turn, results in increasing the supersaturation of the sugar solution in the wet mix. The homogenization part of the "Combinator" disperses the ingredients of the wet mix. The passing through the "Combinator" raises the temperature by about 50° C. and the homogenized wet mix leaves the "Combinator" at a temperature of between 85° C. and 90° C. The discharge from the "Combinator" now consists of a highly super-saturated sugar solution, containing agar in which the cocoa ingredients and some fine sugar crystals are homogeneously dispersed having a temperature of about 80° C.

6. Setting: The equipment consists of a number of shallow metal trays. The material from the "Combinator" is discharged on these trays at room temperature, in a layer of a thickness not exceeding about ½ inch. For continuous operation, instead of trays, a continuous conveyor should be considered. During the drop in temperature, which can be accelerated by passing a stream of air either at room temperature or lower over the thinly spread material, the following reactions take place:

Minute sugar crystals are precipitated from the highly super-saturated sugar solution, dispersed among the hydrolized cocoa particles and agar. In other words, after the setting is completed, the material consists of a mass of minute sugar crystals and cocoa particles, homogeneously dispersed among each other and surrounded by an agar "gel" which contains sugar in solution. This "setting" process is completed when the room temperature is reached.

*Drying.*—The drying process is conducted in several steps, the object being to produce a sufficiently dried material which is stable under any climatic or atmospheric condition and possessing all the requirements of the basic material as previously listed in this report.

7. Raking: The "set" material contains from about 15% to 17% of moisture, which moisture is practically the water which remains occluded in the agar "gel." The "set" material is left for sufficient time exposed to the flow of air at room temperature until it has lost enough moisture to become into a physical condition which allows the material to be raked, and expose, by this manipulation, a much larger surface to the drying air. This raking can be accomplished by scraping the "set" material in different directions by means of a coarse tooth steel comb.

8. Grating: The "raked" material is further exposed to the current of drying air until it has lost again more moisture and becomes in a physical condition whereby it can be grated. The equipment consists of two so-called "Patent Cocoanut Graters #3," each having a capacity of about 1000 pounds per hour. The grating process reduces the aggregates of the material to still smaller particle sizes as those after the raking process.

9. Preliminary screening: The material particles from the graters pass through a 12 to 20 mesh vibrating screen and are discharged either on the drying pans or drying belt as a very thin layer. This screening process disintegrates the agglomerates from the "graters" still further and exposes a still greater surface to the drying air.

10. Final drying: The disintegrated material from the preliminary screen is further exposed to the air current at room temperature and sufficiently dried to stabilize the material. In other words, the material should not be entirely free of moisture but the moisture should be low enough to prevent caking, hygroscopicity, molding, fermentation, etc., if exposed to a warm and moist atmosphere. This moisture percentage is about 5%.

These particular "steps" of the drying process have for their objective the gradual disintegration of the agglomerated minute particles of sugar, cocoa and agar "gel," which agglomerates constitute the basic material particle without disturbing their homogeneous dispersed condition among each other while a gradual loss of moisture takes place simultaneously and avoiding any condition of "case hardening." An allowable percentage of moisture is preserved to increase the penetrability of the material particle for the mixing water and to revert the agar easily into a "gel" by this mixing water.

11. Crushing: The dried material has subsequently to be further disintegrated so that the particles will pass through a 35 mesh screen. The equipment should be more of the crushing rather than the grinding type and a roller mill is probably the desired equipment.

12. Screening: The crushed material is then screened over a 35 mesh screen and the small amount of tailings are in the proper proportion introduced into the wet mixing kettle.

Some of the characteristic properties of the resulting base material are as follows:

1. The ingredients of the base material in the dry state are thoroughly dispersed among each other and reduced to a minute particle size.
2. The particles of the basic dried material are agglomerates of the minute particles of the ingredients and are easily wettable and sufficiently granular in order to be in a free flowing condition.
3. The particles of the base material, although agglomerates, easily absorb the mixing water and permit it to penetrate the particles and disintegrate these agglomerates into the minute particles of the ingredients.
4. Regardless of the proportion of mixing water used, the dispersed state of the ingredient particles in the base material particle remain in this state of disperson.
5. The base material is sufficiently dried to insure stability and prevent molding, fermentation and hygroscopicity of the material even after standing for a prolonged time in hot and moist atmosphere.

In using the product various proportions of water may be employed, depending on the result which it is desired to obtain illustrated by the following formulae:

1 pt. product and 8 pts. water forms a beverage.
3 pts. product and 2 pts. water forms a syrup.
3 pts. product and 1 pt. water forms a sauce.
4 pts. product and 1 pt. water forms an icing.
5 pts. product and 1 pt. water forms a fudge.

Although cold water or milk can be used, the action of the liquid on the powder will be more rapid when the liquid is of body temperature or higher. A little butter mixed with the powder will improve the making of icing and fudge.

It has been found that while the use of an extrinsic stabilizing hydrophilic colloid is useful and desirable, it is not necessary because it has been discovered that the same or similar stabilizing effect may be obtained by creating this stabilizing agent out of the components of the composition themselves, especially the cocoa which, upon hydrolysis, yields hydrolytic products in the nature of hydrophilic colloids which act as stabilizing agents.

This modification of the invention will be illustrated by the following specific example:

Example 2

Proceed as in Example 1 given above except that step 1 entitled "Preparation of the agar solution" is omitted and in step 3 entitled "Preparation of the wet-cocoa sugar mixture," the agar is omitted, and in that step instead of the 48 gallons of the agar solution, 48 gallons of water or about 403 lbs. are substituted. In the above described description of step 3 it will be understood that the stabilization is brought about by the gel-forming hydrophilic colloid formed by hydrolysis of the cocoa instead of by the agar and that wherever agar is mentioned in Example 1, its place will be taken by the colloid formed by hydrolysis of the cocoa.

In addition to the discovery which makes possible the elimination of an extrinsic stabilizing agent, e. g., agar, a further substantial improvement has been made which will now be described and hereinafter claimed.

Example 3

When proceeding according to Examples 1 and 2 it has been found that a total removal of the highly super-saturated sugar mother liquor is not possible and that this mother liquor appears in the final dried product as a congealed sort of tacky amorphous mass, forming a coating around the cocoa and sugar particles. Since the rate of solution of this amorphous coating is much less than that of the finely divided crystalline sugar which is intermittently mixed with the cocoa particles, the said coating retards the solubility and dispersibility of the cocoa sugar particles when mixed with water or aqueous fluids. In this application and examples, means are disclosed for converting this coating into a finely divided crystalline form which produces the property of rapid solubility. To accomplish this object, the mass is dried as described in Examples 1 and 2 until the moisture content is made low, as for example, say around not more than 2 to 3%. At this point the mass may then be reheated, as for example, to a temperature of 160 to 200° F. under constant agitation, whereupon it will be found that there is a transformation of the glossy amorphous coating into finely divided crystalline particles, so that as a result the entire product consists of these rapidly soluble, finely divided particles of very intimately mixed, minute particles of cocoa and sugar. Alternately, instead of drying to the said low moisture content prior to reheating, the mass can be dried down to a substantially bone-dry condition, whereupon a small proportion, for example, 1 to 3% of water, can be added in the form of a finely divided spray or vapor and then the mass can be reheated and agitated to about 160 to 200° F. as above described.

When proceeding according to Examples 1, 2 and 3, it has been found that the cocoa can be substituted by milk solids, malted milk solids, coffee extract solids, ginger extract solids, fruit extract solids, and other flavoring extract solids.

It has also been found that a state of supersaturation of the sugar solution which is employed in this process can be reached by rapidly cooling a saturated sugar solution at a high temperature to a low temperature. Before the cooling step takes place, sufficient sugar of small particle size should be mixed with the hot saturated sugar solution. This additional sugar or so-called seed grain will solidify the over-saturated sugar solution at the lower temperatures during the cooling process by accelerating the rate of crystallization. The amount of this so-called added seed grain should be sufficient to accelerate this crystallization rate, and to reduce the moisture percentage of the solidified mass to not over about 15% moisture in order that the process step of progressive disintegration of the mass, while drying in a stream of gas or air can be applied. For example, in order to produce a dry coffee-sugar product, consisting of small size particles, in which the coffee extract solids are evenly dispersed and diffused in the sugar crystals, the following procedure is applied.

Example 4

A coffee brew is made containing for example 35% of water soluble coffee extract solids and 65% of water. This brew is neutralized preferably with sodium bicarbonate to about 6 pH. This neutralization is necessary to avoid the inversion of the sugar which is subsequently mixed with the coffee brew.

One hundred parts of this coffee brew is mixed with 291 parts of preferably confectioners' sugar at a temperature of not less than 95° C. When all the sugar is dissolved the solution is then saturated as to its sugar content. At this point 100 parts of confectioners' sugar is thoroughly mixed with this saturated sugar solution containing the water soluble coffee extract solids. The liquid is then poured into small trays, and cooled rapidly to preferably as low a temperature as available and not over room temperature. This liquid will then solidify and the solid mass contains 35 parts of coffee extract solids, 391 parts of sugar and 65 parts of water. In other words, the moisture percentage of this solidified mass is about 13%. This mass is then distintegrated and progressively reduced to the desired particle size under simultaneous drying preferably by air current, until the moisture content is made low, as for example, say around not more than 2 to 3%. At this point the mass may then be reheated to a temperature of 160–200° F. under constant agitation as described in Example 3.

The resulting material from the above-described process is a non-hygroscopic product of small particle size which contains about 8.2% of soluble coffee extract solids and about 91.8% sugar. In each particle of the finished material the soluble coffee extract solids are uniformly and evenly dispersed in the sugar crystals.

This product is a new confectionary product which has desirable properties which are enumerated as follows.

The finished product is non-hygroscopic and does not have to be packed in special containers. The finished product can be mixed in different proportions with water or other aqueous materials and the ingredients are rapidly dispersed and dissolved in said liquids. For this reason, this product can be advantageously used for producing coffee flavored fudges, icings, sauces, syrups, beverages and as a coffee flavoring in the manufacture of ice creams, pudding powders, etc.

For instance, when this product is mixed with water in the ratio of about 67 parts of this coffee-sugar material to 33 parts of water, and thoroughly mixed, a coffee syrup is produced which has all the desired qualities of such a syrup.

These same principles of process procedure can be applied for manufacturing confectionary products, containing sugar, milk solids, malted milk solids, ginger extract solids, fruit extract solids and flavoring extract solids.

*Example 5*

To manufacture a dry powdered material, which contains as ingredients sugar and malted milk solids, which material is readily dispersed and dissolved in water and aqueous fluids in different proportions, the following process is applied.

Dissolve 806 grams of sugar in 194 grams of water at 90° C. Then mix into this saturated sugar solution 390 grams of malted milk solids. When these malted milk solids are thoroughly dispersed and dissolved, then mix 94 grams of so-called confectioners' sugar into the liquid. When this seed grain is evenly dispersed in the liquid mass, pour said mass into shallow trays and cool rapidly to about 10° C. When the mass is solidified, disintegrate the mass progressively in an air current of moderate temperature. When the particles are dry and of the required size, reheat the material under constant agitation as described in Example 3.

The finished malted milk-sugar material is readily dispersed and dissolved in different proportions in water and aqueous fluids.

*Example 6*

To manufacture a dry powdered confectionary product containing milk solids and sugar, which product will readily mix with water and aqueous fluids in different proportions, resulting in a uniform consistency of such mixtures, proceed as per Example 5, substituting the malted milk solids by milk solids.

*Example 7*

To manufacture a dry powdered confectionary product, containing ginger root extract solids and sugar, in which product the ginger extract solids are uniformly dispersed and occluded in the sugar crystals, and which product will readily and uniformly disperse and dissolve when mixed with water and aqueous liquids in different proportions, the process procedure is as follows.

A watery extract of ginger root is made containing about 2% of water soluble ginger root extract solids and about 98% of water. Mix into 100 grams of this ginger root extract at a temperature of 95° C. 440 grams of sugar. When this sugar is dissolved add 216 grams of confectioners' sugar and mix thoroughly until the liquid mass is of a uniform consistency, while keeping the temperature at 95° C. Then pour this liquid mass into shallow trays and cool the mass rapidly to preferably 10–15° C. When the mass is solidified proceed to disintegrate and dry the mass as per Example 5 and reheat the dried disintegrated material as per Example 3.

*Example 8*

To manufacture a dry powdered confectionary product, containing orange extract solids and sugar, in which product the orange extract solids are uniformly dispersed and occluded in the sugar crystal, and which product will disperse and dissolve readily when mixed with water and aqueous liquids in different proportion, proceed as per Example 7, substituting the ginger root extract solids by orange extract solids.

*Example 9*

By proceeding as in Examples 7 and 8 products having any desired flavor may be made.

What I claim is:

1. Process of making a chocolated confectionary product which comprises forming a highly super-saturated solution of sugar stabilized by the presence of agar and cocoa by incorporating crystalline sugar and cocoa in a hot aqueous agar solution, homogenizing the product while still hot, cooling it and disintegrating and drying the product.

2. The process of making a chocolated confectionary product which comprises forming a stabilized super-saturated solution of sugar containing cocoa by incorporating crystalline sugar and cocoa in a hot aqueous agar solution, homogenizing the product and crystallizing the sugar in finely divided form from said stabilized super-saturated solution by cooling it and progressively removing water by evaporation and disintegration of the product until a substantially dry product is obtained.

3. The process of making a chocolate confectionary product which comprises forming a stabilized super-saturated solution of sugar containing cocoa by incorporating crystalline sugar and cocoa in a hot aqueous solution of a hydrophilic edible gel-forming colloid, homogenizing the product and crystallizing the sugar in finely divided form from said stabilized super-saturated solution by cooling it and progressively removing water by evaporation and disintegration of the product until a substantially dry product is obtained.

4. Process of making a chocolate confectionary product which comprises incorporating a substantially dry mixture of crystalline sugar and cocoa with a hot aqueous solution of agar containing a proportion of water sufficient at the temperature of incorporation to form a saturated solution of the sugar in said water, whereby a super-saturated sugar solution is obtained due to the adsorption of a part of said water by the cocoa, said super-saturated solution being stabilized by the agar and cocoa, cooling the product substantially to room temperature and disintegrating it and thereafter progressively reducing the particle size by disintegration and air-drying the product in conjunction with disintegration until a finely divided product is obtained, whereby a progressive crystallization of sugar in finely divided form occurs by said cooling and drying in the presence of cocoa and agar.

5. Process of making a chocolate confectionary product which comprises incorporating a substantially dry mixture of crystalline sugar and cocoa with a hot aqueous solution of agar containing a proportion of water sufficient at the temperature of incorporation to form a saturated solution of the sugar in said water whereby a supersaturated sugar solution is obtained due to the adsorption of a part of said water by the cocoa, said super-saturated solution being stabilized by the agar and cocoa, adding a further proportion of sugar, in finely divided form to reduce the mobility of the composition and retard the growth of sugar crystals subsequently separated therefrom, cooling the product substantially to room temperature and disintegrating it and thereafter progressively reducing the particle size by disintegration and air-drying the product in conjunction with disintegration until a finely divided product is obtained, whereby a progressive crystallization of sugar in finely divided form occurs by said cooling and drying in the presence of cocoa and agar.

6. Process of making a chocolated confectionary product which comprises forming a stabilized supersaturated solution of sugar containing cocoa by incorporating sugar and cocoa with hot water, and heating the mixture to hydrolyze the starch content of the cocoa and to create and provide a gel-forming stabilizing colloid; adding a further proportion of sugar in powdered form and dispersing the constituents of the mixture, cooling the stabilized product thus obtained in which the constituents are dispersed to precipitate the sugar in finely divided form from the stabilized mixture and to obtain a solid intimate mixture of finely divided sugar particles and cocoa particles, and progressively disintegrating and drying the product.

7. Process of making a chocolated confectionary product which comprises forming a stabilized supersaturated solution of sugar containing cocoa by incorporating sugar and cocoa with hot water, and heating the mixture to hydrolyze the starch content of the cocoa and to create and provide a gel-forming stabilizing colloid, adding a further proportion of sugar in powdered form and dispersing the constituents of the mixture, cooling the stabilized product thus obtained in which the constituents are dispersed to precipitate the sugar in finely divided form from the stabilized mixture and to obtain a solid intimate mixture of finely divided sugar particles and cocoa particles, and progressively disintegrating and drying the product at about room temperature until the moisture content of the product is not more than about 2 to 3% and then reheating the product under constant agitation until the sugar component of the entire mass becomes homogeneously crystalline.

8. The process of making a product in dry powder form which upon mixing with aqueous materials, is rapidly dispersed to produce a liquid confectionary product, which process comprises providing a mixture containing a sugar, water, and a material selected from the group consisting of cocoa, chocolate, milk solids, malted milk, coffee extract solids, and flavoring extract solids, said mixture containing not more than about 15% by weight of water, and not less than about 45% sugar by weight, heating said mixture to an elevated temperature substantially above room temperature to provide a liquid which is at least saturated at said elevated temperature in respect of the sugar content thereof, cooling said liquid to a maximum temperature not higher than about room temperature to produce a solid mass, progressively disintegrating and drying said mass until the moisture content of said mass is not more than about 2 to 3%, and then reheating the product under constant agitation until the sugar content of said mass becomes homogeneously crystalline.

FRANCIS A. BODENHEIM.